US008606873B2

(12) United States Patent
Park et al.

(10) Patent No.: US 8,606,873 B2
(45) Date of Patent: Dec. 10, 2013

(54) METHODS AND APPARATUS FOR SECURELY ADVERTISING IDENTIFICATION AND/OR DISCOVERY INFORMATION

(75) Inventors: Vincent D. Park, Budd Lake, NJ (US); Michaela Vanderveen, Tracy, CA (US); Junyi Li, Bedminster, NJ (US); M. Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 12/163,179

(22) Filed: Jun. 27, 2008

(65) Prior Publication Data

US 2009/0327391 A1 Dec. 31, 2009

(51) Int. Cl.
| G06F 15/16 | (2006.01) |
| G06F 7/04 | (2006.01) |
| H04W 4/00 | (2009.01) |
| H04L 12/28 | (2006.01) |
| H04L 9/00 | (2006.01) |
| H04J 3/06 | (2006.01) |
| H01Q 1/36 | (2006.01) |

(52) U.S. Cl.
USPC ........... 709/207; 370/338; 370/392; 370/503; 726/9; 380/268; 455/435.2; 343/895

(58) Field of Classification Search
USPC ........... 709/204–207; 370/392, 338; 343/895; 726/9; 380/268; 455/435.2
See application file for complete search history.

(56) References Cited

U.S. PATENT DOCUMENTS 7,251,669 B1 * 7/2007 Arora .......................... 707/695
7,542,485 B2 6/2009 Bingham et al.
2001/0045914 A1 * 11/2001 Bunker ........................ 343/895
2003/0149874 A1 8/2003 Balfanz et al.
2004/0015693 A1 1/2004 Kitazumi (Continued)

FOREIGN PATENT DOCUMENTS

CN 1735264 A 2/2006
JP 2001086231 A 3/2001

(Continued)

OTHER PUBLICATIONS

International Search Report and Written Opinion—PCT/US2009/048907, International Search Authority—European Patent Office—Oct. 9, 2009.

(Continued)

Primary Examiner — Ian N Moore
Assistant Examiner — Kiet Tang
(74) Attorney, Agent, or Firm — Joseph B. Agusta

(57) ABSTRACT

Methods and apparatus related to a peer to peer wireless communications system supporting secure advertisement of identification and/or discovery information e.g., upper layer discovery information, are described. Air interface timing and/or other information received from a third device, e.g., a beacon or GPS transmitter is incorporated in the computation of identification/discovery information which is communicated from a first device to a second device. The second device stores some identification/discovery credentials corresponding to the first device, which have been communicated out of band from the first device to the second device. Upon receipt of a identifier from a first device, the second device determines if the stored information corresponds to the device that transmitted the identifier. Various embodiments facilitate secure advertisement of identification and/or discovery information and discovery, e.g., selective discovery by trusted peers.

35 Claims, 6 Drawing Sheets

(56) References Cited

U.S. PATENT DOCUMENTS

| | | |
|---|---|---|
| 2004/0132481 A1 | 7/2004 | Sugaya |
| 2005/0107037 A1 | 5/2005 | Delmulle et al. |
| 2005/0135429 A1* | 6/2005 | Bingham et al. ............. 370/503 |
| 2005/0169219 A1* | 8/2005 | Serpa et al. ................... 370/338 |
| 2005/0202782 A1 | 9/2005 | Sasai et al. |
| 2007/0142048 A1* | 6/2007 | Anigstein ................. 455/435.2 |
| 2007/0171910 A1* | 7/2007 | Kumar .......................... 370/392 |
| 2007/0211678 A1 | 9/2007 | Li et al. |
| 2008/0031220 A1 | 2/2008 | Li et al. |
| 2008/0037487 A1* | 2/2008 | Li et al. ........................ 370/338 |
| 2008/0289019 A1* | 11/2008 | Lam ................................. 726/9 |
| 2010/0128877 A1* | 5/2010 | Bloch et al. .................. 380/268 |

FOREIGN PATENT DOCUMENTS

| | | |
|---|---|---|
| JP | 2002124960 A | 4/2002 |
| JP | 2003309558 A | 10/2003 |
| JP | 2004015558 A | 1/2004 |
| JP | 2004312331 A | 11/2004 |
| JP | 2005244345 A | 9/2005 |
| JP | 2008061258 A | 3/2008 |
| WO | 2007082252 | 7/2007 |

OTHER PUBLICATIONS

Taiwan Search Report—TW098121694—TIPO—Aug. 14, 2012.

* cited by examiner

METHODS AND APPARATUS FOR SECURELY ADVERTISING IDENTIFICATION AND/OR DISCOVERY INFORMATION

FIELD

Various embodiments relate to wireless communications, and more particularly, to methods and apparatus for securely advertising and/or communicating identification information, e.g. peer discovery information, in a communications system.

BACKGROUND

Peer to peer devices in a communications system have a need to be able to discover other peer devices, e.g., so that they can communicate with one another. While it is important that a discovery capability be supported in a peer to peer system, there is also a need for security in that a peer device may not want to be discoverable by devices with which it may not want to interact. As a result, there is a need to be able to broadcast peer discovery information to other devices with which a device may want to establish peer communications in a secure manner. There is also a need to be able to discover the presence of other devices, e.g., devices which may broadcast discovery information in an encrypted or otherwise secure manner, with which the peer device may want to communicate.

Based on the above discussion, it should be appreciated that there is a need for peer discovery mechanisms, e.g., methods and/or apparatus that support the secure advertisement of peer discovery and/or identification information. There is also a need for methods and apparatus which can be used to discover peer devices advertising discovery and/or other identification information in a secure manner.

SUMMARY

Methods and apparatus for securely advertising and/or communicating identification information, e.g. peer discovery information are described. Some exemplary embodiments are described in the context of a peer to peer system but the methods described herein are well suited for use with a variety of wireless communications systems, e.g., systems in which one device may detect signals transmitted by another device. Accordingly, it should be appreciated that the described methods are not limited to peer to peer systems.

In accordance with various aspects, peer discovery information, e.g., one or more identifiers associated with a first communications device, are communicated to one or more devices. The one or more devices to which the information is communicated are devices which the first device wants to be able to discover the first device. For example, the devices to which the discovery information is communicated may be members of a group of trusted devices with which the first device has some association in terms of a business association, service relationship, shared interests, or other common interest which might give the first and second devices a reason to discover each other and establish a communications session. The communication of the identification and/or discovery information including one or more identifiers and optionally an indication of a predetermined, e.g., encryption or hashing, function to be used and optionally a key or other information to be used with the predetermined function, is sometimes performed out of a communications frequency band or channel between the first device and the other devices which is subsequently used to broadcast peer discovery information.

While out of band communication for initial transmission of the identifier or identifiers which are later used to support secure discovery adds a level of security, this is not critical to the invention. Accordingly, in some embodiments the communication of the identification and/or discovery information between the first device and other devices is performed using in-band signaling at a time prior to the later broadcasting of secure peer discovery information, e.g., encrypted or one-way hashed versions of identifiers. The subsequent use of secure broadcast signals to communicate discovery information provides a level of security and protection against detection by devices which may receive the broadcast signal but from which the first device would prefer to remain undetectable.

In accordance with some aspects, a first device which seeks to be discoverable by devices to which it previously communicated some discovery information, broadcasts a secure discovery signal including one or more secured identifiers. The securing operation maybe, and sometimes is, implemented as a simple hash operation of an identifier to be advertised and a value derived from a signal received by the first device which may also be received by other devices in the vicinity of the first device.

Devices which receive the secure broadcast signal including the one or more secured identifiers and have stored identifiers to be advertised by other devices, e.g., because they were previously communicated to the device by one or more other devices to enable discovery, compute expected secure identifier values corresponding to one or more of the stored identifiers using a value derived from the same signal from which the first device derived the secure broadcast signal including the one or more secured identifiers. The second device then does a match determination to determine if one or more of the expected secure identifier values it generates matches the received secured identifiers obtained from the received secure broadcast signal. If a match is determined, the receiving device determines that it has received a signal corresponding to a communications device of interest. In some embodiments, detection of a match results in an alert signal being generated. In response to the alert signal a communication session may, and sometimes is, initiated with the communications device which transmitted the secured identifier which produced the match.

As should be appreciated the use of relatively few bits for transmitted secured identifiers can result in multiple different devices transmitting the same secured identifier value at a given point in time. In order to address this issue, in some but not necessarily all embodiments multiple matches may be required before a communication session is initiated with a device. This approach of requiring multiple matches provides a higher degree of certainty that the device being contacted is in fact a device of interest and reduces the risk that another device will be contacted.

From the above discussion it should be appreciated that an advertising party, e.g., a first user and/or a first device may wish to be discovered only by certain other peers, e.g., a second user and/or a second device and/or other parties of interest rather than by every device or user in the range. On the other hand, another user or device, e.g., a monitoring party may be interested in finding out other peers of interest in the range, which may include friends, colleagues, other networks, wireless internet access points, restaurants etc. In such a scenario it is effective if certain identification information, e.g. certain device discovery credentials as ID, Key etc., are communicated from an advertising party, e.g. a first device to few or a limited number of parties of interest prior to a discovery message being broadcast. The receiving party, e.g., a second device, may store this information and utilize this stored information at a later stage in order to recognize the advertising party.

Security is provided in various aspects for communicating the identification and/or discovery information from an advertising party to one or more parties, e.g. peer communication devices, by using a signal from another device as the basis for a computation input value used to secure a discovery advertisement. The signal from which the computation input is generated maybe a time varying signal from a third device, e.g., a Beacon, time synchronization, and/or GPS transmitter.

In one exemplary method in which a first device advertises discovery information, the first device receives a signal from a third device, computes a first identifier, e.g., a secured identifier value, from a value derived from the signal received from the third device and stored identification information. The stored identification information maybe, e.g., an identifier stored in said first device. The first device then transmits, e.g., broadcasts, said first identifier in a signal to the second device. The identifier may be broadcast in a secured form thereby advertising a secured version of the stored identifier. In some embodiments, the identification information, e.g., stored identifier being communicated in secured form, identifies one of a fact, preference, association, product, service, software application, interest, network, entity, and user corresponding to the first device.

In one exemplary embodiment a first communications device comprises a receiver module configured to receive a signal from a third device, a computation module configured to compute a first identifier from a first value derived from the signal received from the third device and stored identification information, e.g., a previously stored identifier value, stored in said first device. The first identifier maybe, e.g., a secured form of a stored identifier. In the exemplary embodiment the first communications device further includes a transmitter module configured to transmit said first identifier to a second device in a signal, e.g., a broadcast signal used to advertise identifier information corresponding to the first device. In some embodiments, the transmitter module is a wireless transmitter. Over time, multiple identifiers maybe transmitted. These may be different secured versions of the same stored identifier. Accordingly, in some embodiments, the computation module is configured to compute first and second identifiers according to a function, such as a one-way hash function used to implement a securing operation, where time information may also be an input to the function. The function and inputs are known to devices which are intended to be able to discover the first device. The function information may, and in some embodiments is, communicated with identifiers supplied by the first device to the devices which may seek to discover the first device, e.g., at a time prior to broadcast of the first identifier used to convey identifier information in a secured form.

In one embodiment of an exemplary method of operating a second device, e.g., a device receiving a secured identifier broadcast by a first device, discovery includes receiving a signal from a third device, receiving a first identifier signal communicating a first identifier from a first device, computing a first discovery value from a value derived from the signal received from the third device and stored identification information stored in said second device. The stored information maybe, e.g., a first identifier corresponding to a device of interest. The method further includes determining, based on the computed first discovery value and said stored information, if stored identification information, e.g., a stored identifier, corresponds to the first device. In some embodiments determining if the stored identification information corresponds to the first device includes determining if the computed first discovery value matches said first identifier. In some embodiments, said determining including making a probabilistic determination.

An exemplary second communications device in some embodiments includes a receiver module configured to receive a signal from a third device and to receive a first identifier signal communicating a first identifier from a first device. The second communications device may also include a computation module configured to compute a first discovery value from a value derived from the signal received from the third device and stored identification information, e.g., an identifier, stored in said second device. A determination module which is configured to determine, based on the computed first discovery value and said first identifier, if the stored identification information corresponds to the first device is also included in the second device in some embodiments.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
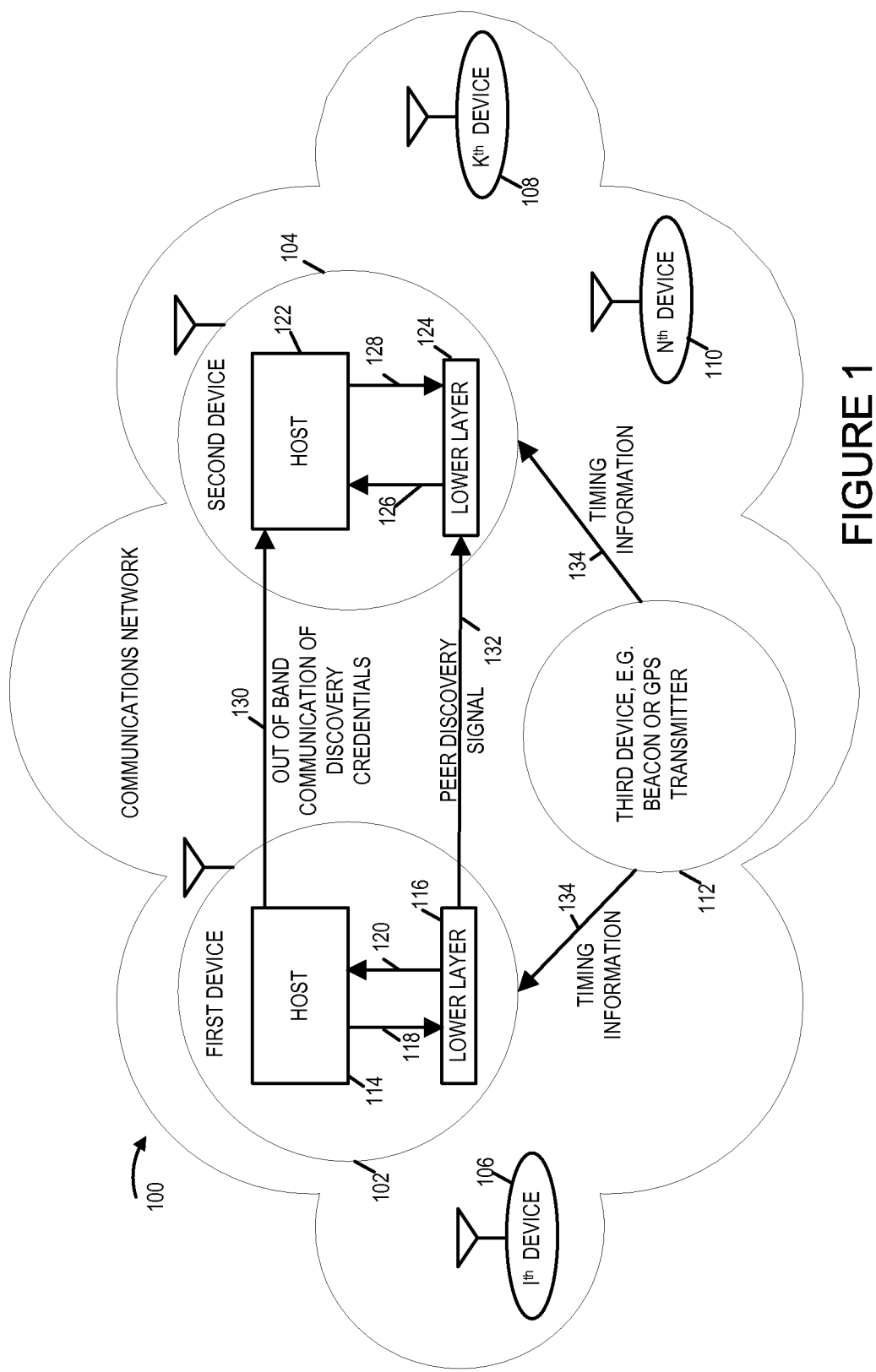
FIG. 1 illustrates an exemplary wireless communications system, e.g., an ad hoc peer to peer wireless communications system, in accordance with an exemplary embodiment.

FIG. 1 illustrates an exemplary wireless communications network 100, e.g., an ad hoc peer to peer wireless communications network, in accordance with one an exemplary embodiment. Exemplary communications network 100 includes a plurality of communications devices, e.g., peer to peer communications devices in addition to other communications devices such as the third device 112. The plurality of peer to peer communications devices include a first, second, $I^{th}$, $K^{th}$ and $N^{th}$ peer to peer communications devices 102, 104, 106, 108 and 110, respectively. The third device 112 may be a peer to peer device or a non-peer to peer communications device which transmits a signal which can be detected by the peer to peer communications devices. For example, the third device may be a beacon transmitter, time synchronization transmitter or GPS (Global Positioning System) transmitter. As will be discussed below, the first and second peer to peer communications devices 102, 104 may broadcast and receive peer discovery messages and/or other information as part of a process of establishing a connection.

In the FIG. 1 example, the first communications device 102 includes a host module 114 and a lower layer module 116. The host module, among other things, is responsible for sending and/or exchanging signals with other devices and interacting with the lower layer module 116 which generates various lower layer signals. The arrows 118 and 120 show internal signaling exchange and/or messaging to/from the elements of the first device. Other peer to peer communications devices in the communications network 100 may be implemented using the same or similar components as to those used to implement the first communications device. For example, in the FIG. 1 example, the second device also includes a host module 122 and a lower layer module 124. The arrows 126 and 128 show internal signals and/or messages communicated between the elements of the second device 104.

In accordance with one exemplary embodiment, the first device 102 communicates, e.g., using out of band signaling, its identification/discovery credentials to the second communications device 104, as shown by arrow 130. This out of band signaling may be communicated using a different communications channel or communications band from the wireless communications band in which a peer discovery signal 132 is broadcast. This use of out of band signaling to communicate information that is used to interpret, process and/or check peer discovery signal 132 communicated via, e.g., a wireless communications signal, adds a degree of security which would not be present if the same band or channel used to communicate peer discovery signal 132 was also used for communication of the discovery credentials 130. While the term out of band is used to describe communication of signal 130 it should be appreciated that the same physical communication band could be used as that used for signal 132 but with the information communicated as part of an established connection between the first and second devices 102, 104 being secured differently, than then information communicated by peer discovery signal 132, thereby creating a secure communications channel which can be considered out of band to the broadcast channel used to broadcast peer discovery signal 132.

The third device serves as a source of a reference signal available to multiple peer to peer devices. The third device 112 may be, e.g. a beacon, a time synchronization, or a GPS transmitter that broadcasts a signal such as an air interface timing signal and/or other synchronization signal which can be detected by communications devices in the system shown in FIG. 1. As will be discussed below the first device 102 may use the information included in the signal from the third device 112 to generate a discovery/identification signal such as signal 132. The use of a signal from the third device 112 adds security to the communication of the peer discovery signal 132 since it is used to introduce variation, e.g., over time, into the communicated peer discovery signal 132 while still permitting the devices to which discovery credentials were communicated, e.g., by signal 130, to interpret the communicated information.

Figure 2:
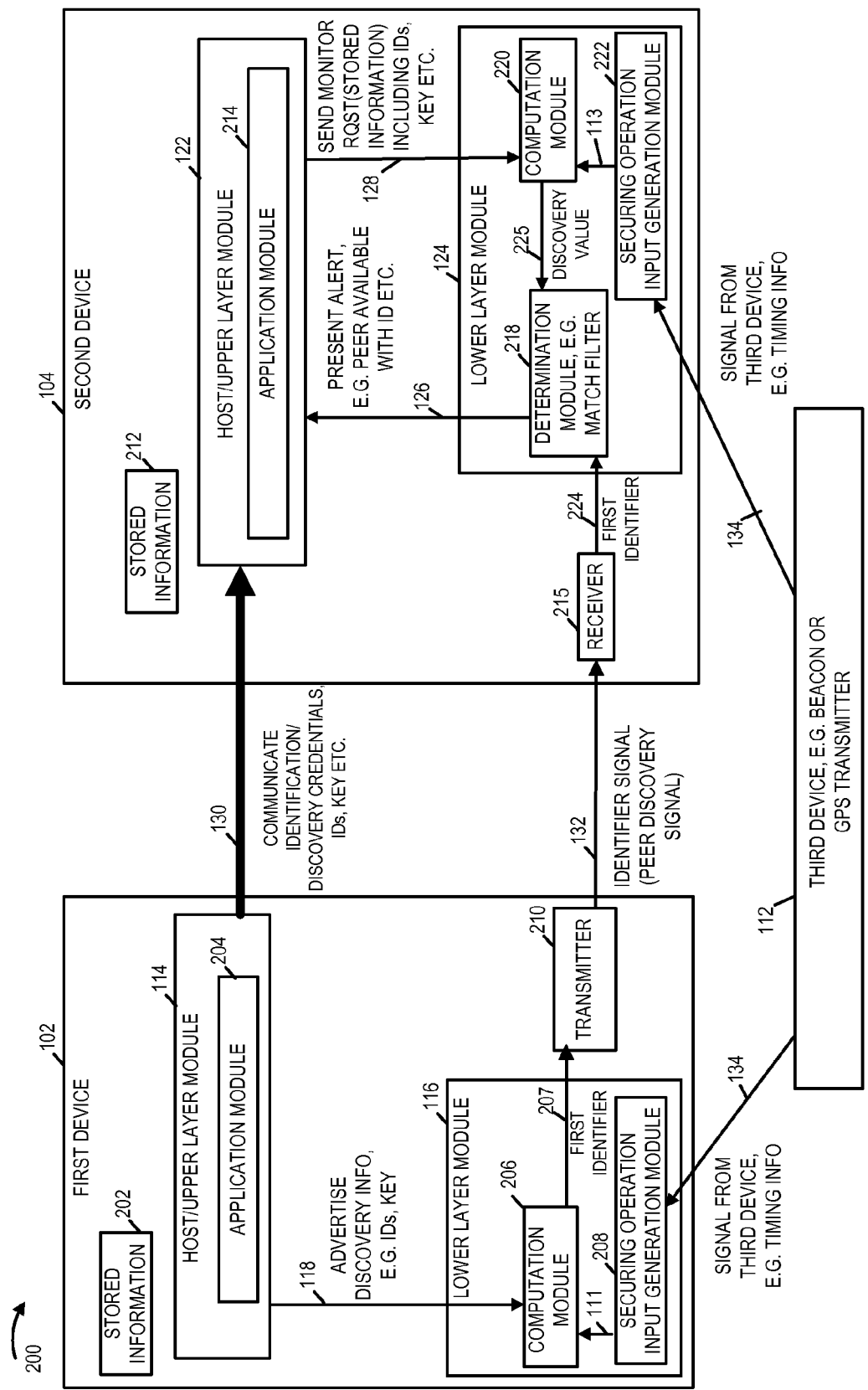
FIG. 2 is a more detailed illustration of a first, second and third devices featured in the peer to peer wireless communication system of FIG. 1 showing various elements and the signaling exchange between the devices in greater detail.

FIG. 2 is a drawing 200 of the first, second and the third devices 102, 104, 112 featured in the peer to peer wireless communication system of FIG. 1 showing the various elements and signaling exchange between the devices in greater detail. It should be appreciated that in some embodiments the first and second devices may be interchangeable and thus may include the same or similar elements and/or modules as noted above. The functions performed by an element/module of the first device may be performed by a similar element/module in the second device. As shown in FIG. 2, the first device 102 includes the host/upper layer module 114, the lower layer module 116, stored information 202 which may be included in a memory, and a transmitter 210. Stored information 202 includes, e.g., device identification information, keys, algorithm, securing function information, identification information associated with the first device 102 and/or information corresponding to other parties of interest such as devices, services, networks etc. which may be used to detect the presence of the other devices from broadcast signals as will be described. The upper layer module 114 communicates, e.g., using out of band signaling, identification/discovery credentials corresponding to the first device 102 to the second communications device 104 via signal 130. It should be appreciated that this out of band communication of discovery credentials normally occurs, e.g., prior to transmitting the first identifier signal 132 thereby allowing the signal 132 to be interpreted taking into consideration the information communicated via signal 130.

In some embodiments the host/upper layer module 114 includes an application module 204. The application module 204 interacts with and controls one or more elements of the first device, such as the lower layer module 116. Thus, the application module in the upper layer module may control the communication of the signal 130 to the second device 104. In some embodiments it also controls, via control/information signal 118, the lower layer module 116 to implement a securing operation used to encrypt identification/discovery information prior to the encrypted discovery information being broadcast to other peer devices. The lower layer module 116 includes a computation module 206 which performs a securing operation such as, for example, a one-way hash, on inputs supplied to the module 206. The lower layer module 116 also includes a securing operation input generation module 208 used to generate an input to the computation module 206. The securing operation input generation module 208 derives values from signals received from the third device. The derivation may be implemented in a variety of ways, for example, a value can be generated from information recovered, e.g. decoded, from the received signal, or generated from an attribute of the received signal such as a tone frequency or the time at which a particular signal is received from the third device. Over time, as different signals are received from the third device 112, the input value to the computation module 206 will change as the securing operation input generation module generates different output values. The securing operation input generation module acts, in some embodiments, as a pseudo random number generator with the signal from the third device acting as a seed to the pseudo random number generation process implemented by the securing operation input generation module 208. The securing operation input generation module 208 supplies an output value it generates to an input of the computation module 206 as shown by arrow 111 so that it can be used as one input to the securing operation, e.g., one-way hash, implemented by computation module 206. Over time, it should be appreciated that in response to different signals from the third device, the securing operation input generation module 208 will generate first, second, third values and so on which will vary as the signal from the third device varies.

In addition to receiving the output of the securing operation input generation module 208, the computation module 206 also receives, as another input, a portion of the stored information 202, e.g., a peer discovery identifier corresponding to the first device 102 and/or other information to be communication in a broadcast signal. The computation module then computes, e.g., by performing a securing operation, an identifier value from the received inputs, e.g., the derived first value supplied from the module 208 and a portion of the stored identification information 202. The transmitter 210 transmits the identifier value in an identifier signal, e.g., identifier signal 132. As the input from the securing operation input generation module 208 changes, the identifier signal 132 being broadcast will change even if the peer discovery identifier being communicated remains the same.

Receipt and processing of signals, such as the identifier signal 132, by the second device will now be described. The second device 104 includes a receiver 215 used by the second device to receive signals/information/messages from other communications devices. The second device 104 also includes the host/upper layer module 122, the lower layer module 124 and a receiver 215. The host/upper layer module 122 includes an application module 214 and also includes stored information 212 which may be included in a memory. The stored information 212 includes identification/discovery credentials received by the second device from other peer devices, e.g., from the first device, via for example, signal 130. The stored information 212 includes, for example, information such as device/node identifiers corresponding to other devices, keys, identification information associated with the second device itself, as well as similar information corresponding to other parties of interest such as devices, services, networks etc which may or may not be peer to peer devices. The application module 214 may perform similar functions as performed by the application module 204 of the first device. For example the applications module 214 controls some elements/modules of the second device, and their operation including, e.g., the computation of a discovery value as will be discussed in detail in the section that follows. The process of computing the discovery value computed by the computation module 220 may, and sometimes is performed under the direction of the application module 214. The lower layer module 124 includes the computation module 220 which performs, in some embodiments, similar functions as performed by the computation module 206 of the first device and therefore will not be discussed again to avoid repetition. The lower layer module 124 further includes a determination module 218, e.g., match filter, and a securing operation input generation module 222. The module 222 derives a value from a signal 134 received from the third device. While two arrows are used in the FIG. 2 example to show the signal 134, it should be appreciated that this is a broadcast signal which can therefore be received by multiple devices at the same time (assuming differences in distances from the third device are ignored or minimal as is normally the case). The securing operation input generation module uses the same function, e.g., pseudo random number generation or other function, as that of the securing operation input module 208, and therefore derives the same value as derived by module 208 from the signal 134 from the third device. The value generated by securing operation input generation module 222 is supplied as an input to the computation module 220 as shown by arrow 113 and is used as will be discussed further below with regard to an example.

In order to facilitate better understanding of the functions performed, in accordance with an exemplary embodiment, by various devices and their elements shown in FIG. 2, an example will now be discussed. For the purpose of this example, we will assume that the first device 102 seeks to be discoverable to the second peer device 104 but may wish to avoid being detected by other devices which may receive its broadcasts. To enable such discovery the first device communicates, e.g., out of band, its identification/discovery credentials to the second communications device 104, as shown by arrow 130. This is normally done prior to broadcasting peer discovery signal 132 which conveys identification information corresponding to the first device 102. It should be appreciated that the first device may have communicated its identification/discovery credentials to several other peer devices of interest with whom the first device may wish to communicate at some future time as the devices may encounter each other as they are moved around, e.g., as a user travels from one location to another. Following the initial communication of information 130, the host module 114 in the first device sends a signal, as shown by arrow 118, to the lower layer module 116 to advertise identification/discovery information in a secure manner. The computation module 206 in the lower layer module 116, in response to the signal from the host module 114, uses the identification information supplied by the host module 114 as an input to securing operation, e.g., one-way hash function, supported by module 206. As should be appreciated, the first device 102 includes a receiver which received signals from various devices, e.g., a third device 112. As discussed above, both the first device 102 and the second device 104 receive the signal from the third device as shown by arrow 134 and therefore both devices can use this signal to support hash/encryption operation. The computation module 206 secures the identification/discovery information by utilizing the value or values derived from the signal received from the third device and the stored identification information 212 corresponding to the device identification information, e.g., identifier corresponding to the first device 102, to be advertised. The securing operation input generation module 208 derives a first value from the signal received from the third device and supplies this derived value as another input to the, e.g., hash/encryption, function supported by computation module 206. Following the receipt of both inputs, the computation module 206 generates an identifier to be broadcast. In some embodiments, the identifier includes fewer bits than the stored identification information. The transmitter 210, then transmits this first identifier to the second device as a discovery signal as shown by the arrow 132. The signal 132 will change over time as the received signal from the third device 112 changes with time.

The second device monitors for identification/discovery broadcasts, e.g., advertisements, from other communications devices such as the first device 102. A host/upper layer module 122 in the second device 104 sends a monitoring request signal including ID, Key or other identification information, to the lower layer module 124 which among other things, processes received signals as part of a process of monitoring for discovery advertisements from other devices. The receiver 215 in the second device receives the discovery message from the first device 102, recovers the first identifier and supplies this information, e.g., under control of host/upper layer module 122, to the determination module 218. The determination module 218 maybe implemented as, e.g., a match filter 218, or using other probabilistic match and/or comparison functions. The computation module 220 in the lower layer module 124 receives, as an input, the information included in the monitoring request signal 128, e.g., stored information including, for example, ID, Key etc. of the devices for which the monitoring request was made by upper layer module. The securing operation input generation module 222 derives a value from the signal 134 received from the third device and supplies this as an input to the computation module 220. The computation module 220, upon receipt of the inputs, e.g., stored information and the derived value, computes a discovery value. It should be appreciated that the stored information in the second device includes the identification/discovery credentials of the first device communicated earlier to the second device. Following the computation of the discovery value using the same, e.g., encryption/hash, function used by computation module 206 of the first device 102, the computation module 220 supplies the first discovery value to the determination module 218. The determination module 218, e.g. match filter, processes the first identifier received from the first device and the first discovery value generated by the computation module 220 to determine if they match. Depending on the embodiment, the match determination made by the determination module 218 may be a probabilistic determination which can result in a match being determined even if the two values do not precisely match, e.g., based on a determination that the values sufficiently match to the point where a match should be declared. If the two values match as determined by module 218, then an alert 126 is generated and presented to the upper layer module 122 to notify that a peer device of interest has been detected. The alert 126 may include information identifying the particular device with which a match has been determined. Following such an alert 126, the first and second device may establish a connection.

In some embodiments, a second or multiple rounds of verification may be desired, i.e., another round of communicating an identifier value from the first device to the second device, and the second device again computing a second discovery value to match it with the received second identifier from the first device, and then finally making a determination if the discovery advertisement is from the first device or not. In such embodiments, a connection between the first and the second device is established after verifications are made in the multiple rounds. Such a multi-round approach may be useful where the identifier signal 132 communicated during each round is only a few bits with the potential for different devices to advertise the same bits at a given point in time due to, e.g., the output of the computation module being truncated or otherwise reduced to a few bits. However, as the output of each device changes over time, the probability of repeated matches being declared from different devices will decrease increasing the probability that an accurate match determination has been made.

Figure 3:
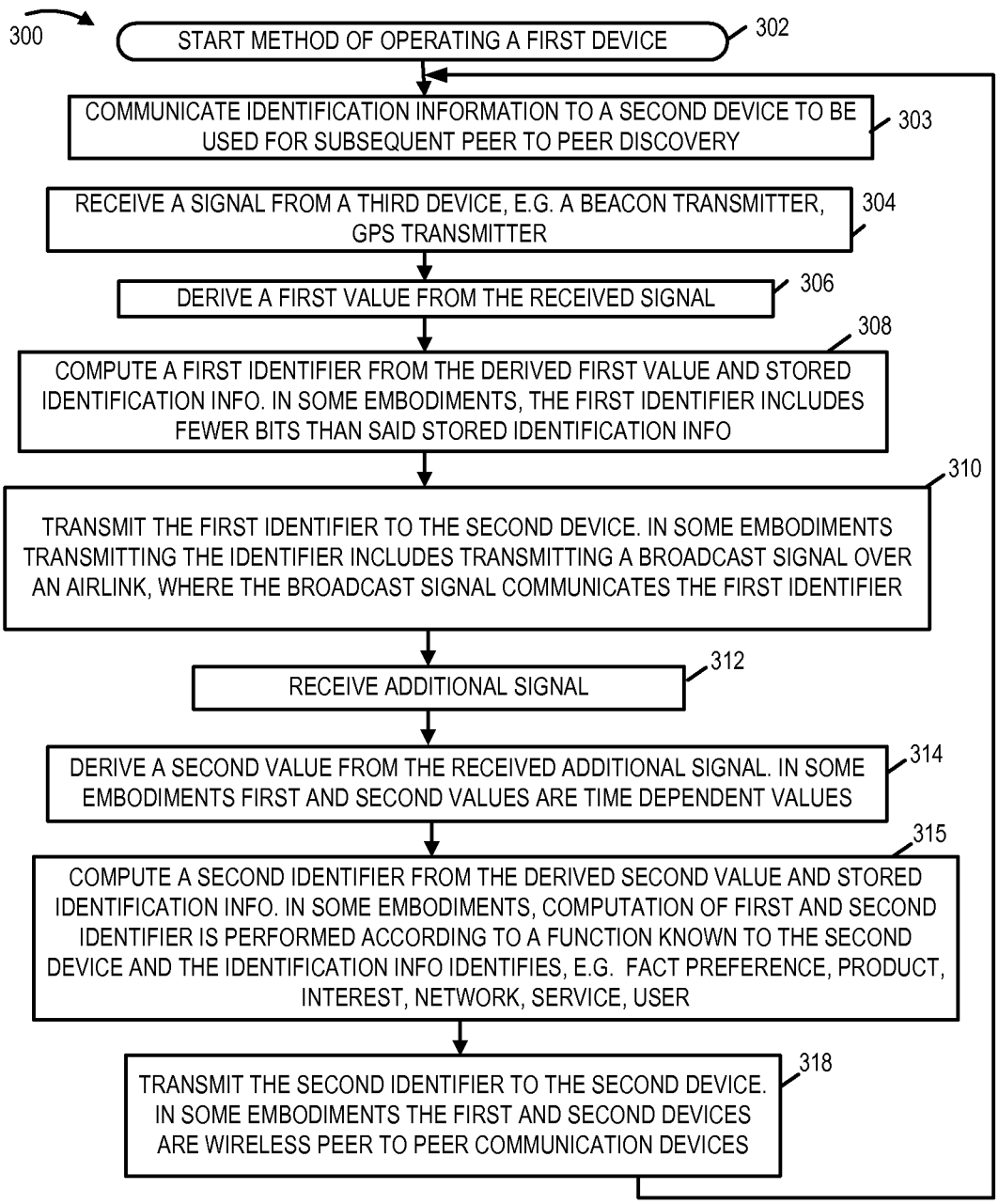
FIG. 3 is a flowchart of an exemplary method of operating a first device to communicate identification information to a second device in accordance with one exemplary embodiment.
Figures 4, 4A, 4B:
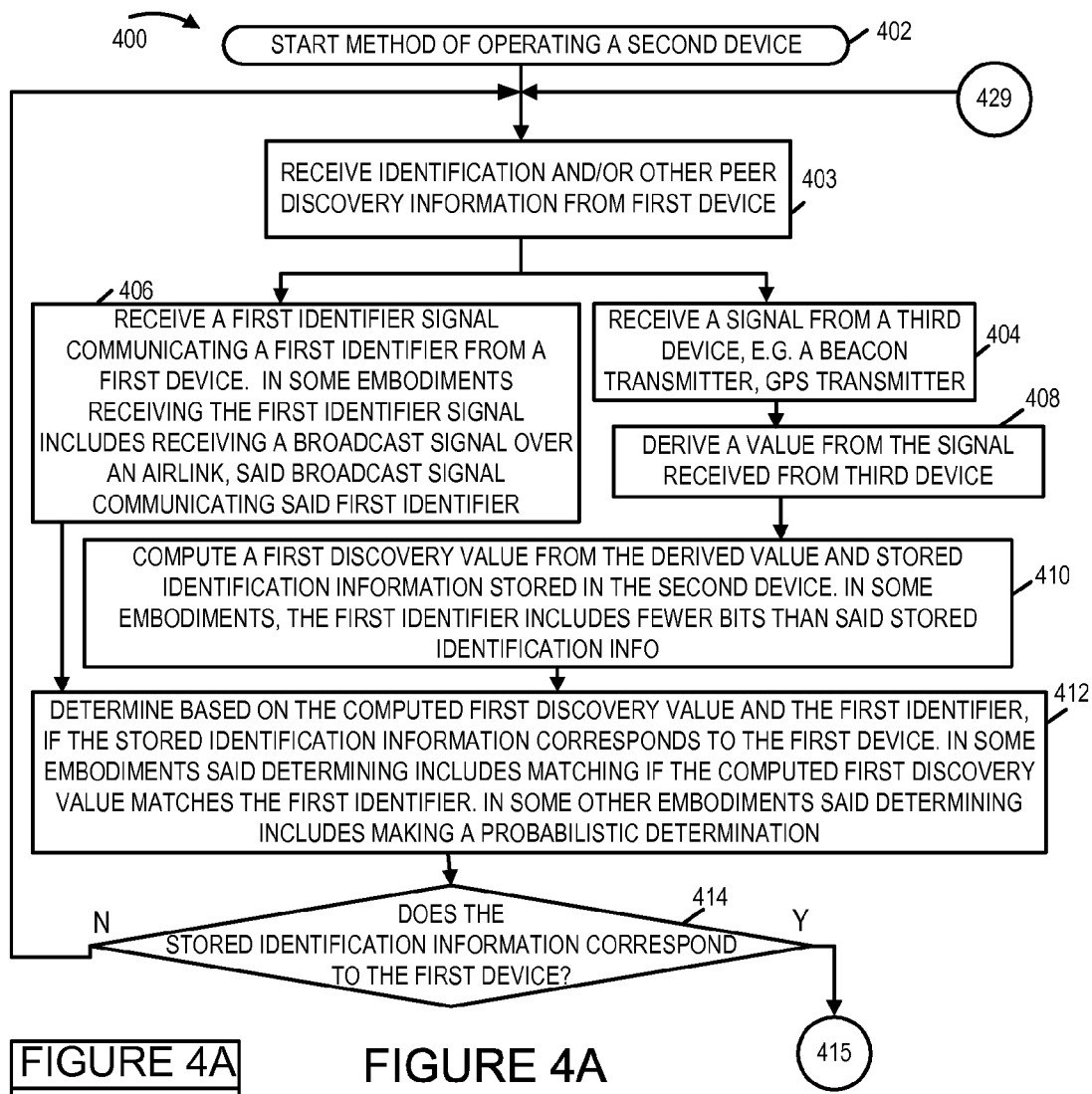
FIG. 4, which comprises the combination of FIGS. 4A and 4B, is a flowchart showing the steps of an exemplary method of operating a second device, e.g., a device receiving and processing peer discovery information, in accordance with one exemplary embodiment.
Figure 4B:
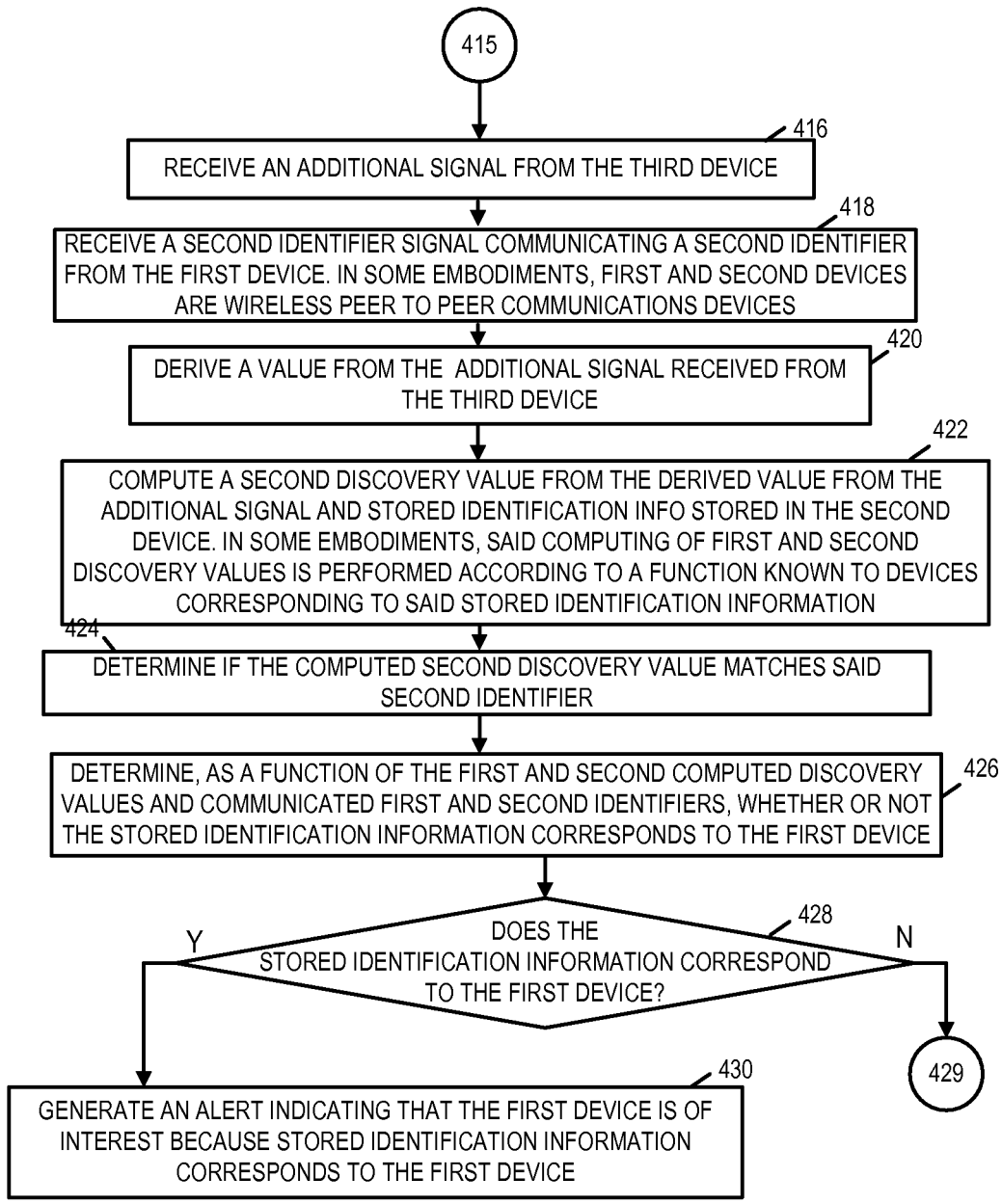

While an exemplary embodiment has been used to describe various features, the method used in some embodiments will become even clearer when considered in view of the flow charts shown in FIGS. 3 and 4.

FIG. 3 is a flowchart of an exemplary method of operating a first device to communicate identification information to a second device in accordance with one exemplary embodiment. The first device may be, e.g., first peer to peer communications device 102 shown in FIG. 2 and while the second device may be peer to peer communications device 104.

Operation starts in step 302 where the first and second devices are powered on and initialized. Then in step 303 the first device communicates identification and/or other discovery credentials to the second device 104 using out of band signaling, e.g., via signal 130. Signal 130 may be sent over a communications network, e.g., the internet or a base station, as opposed to via a direct peer to peer signal.

Operation proceeds from step 303 to step 304 which occurs at some subsequent time to the time at which identification information and/or discovery credentials were communicated to the second device. Thus, at step 304, the identification information and/or discovery information is already available to the second device and can be used to interpret broadcast discovery signals transmitted by the first device. In step 304, the first device receives a signal from a third device, e.g., a beacon or a GPS transmitter. The signal from the third device serves as a reference signal from which a computation input value can be generated. The signal from the third device may communicate air interface timing and/or other information.

In step 306, the first device derives a first value from the received signal. This value may be derived from information included in the received signal or from other signal characteristics such as frequency and/or timing. Operation proceeds from step 306 to step 308. In step 308, the first device computes a first identifier from the derived first value and the stored identification information, e.g., by using the computation module as discussed in the example of FIG. 2. In some embodiments, the first identifier includes fewer bits than said stored identification information. For example, the stored identification information may be of 13 bits, however, in accordance with the exemplary embodiments as discussed herein, the first identifier may have, e.g. 8 bits. The 8 bits may be the result of the computation module hashing an identifier corresponding to the first device with the first value derived from the signal from the third device and then truncating the result. The computation module 206 may, and in various embodiments does, include a hash module and truncation module for performing these operations. Operation proceeds from step 308 to step 310 wherein the first device transmits the first identifier to the second device and any other devices within range, e.g., using a wireless transmitter 210 to broadcast a signal communicating the first identifier. Thus, in some but not necessarily all embodiments, transmitting the first identifier includes transmitting a broadcast signal over an airlink, where the broadcast signal communicates the first identifier. Operation proceeds from step 310 to step 312.

In step 312, the first device receives an additional signal from the third device. The additional signal may be received at a different point in time, i.e., a point in time different from the time when a signal was received from the third device (as in step 304). The additional signal may be the same type of signal as received in step 304 but may differ due to a change in the signal being transmitted since the last time it was received. Operation proceeds from step 312 to step 314. In step 314, the first device derives a second value from the additional signal received from the third device. The derived second value for use as an input to the computation module 206. It should be appreciated that since the input to the derivation process changes over time, in some embodiments the first and second values derived by the computation module 206 and/or the first and second identifiers generated by securing operation input generation module 208 are time dependent values.

Operation proceeds from step 314 to step 315 in which the first device 102 computes a second identifier from the derived second value and the stored identification information in the same or a similar manner to the way the first identifier was computed. Thus, while the identifier which in some embodiments is hashed with the second derived value may remain the same, due to a change in the derived value serving as the other input to the securing/hash operation the output will change. In some embodiments, computation of the first and second identifier is performed according to a function known to the second device. This allows the second device to generate expected first and second identifiers which can be compared to the broadcast signal in order to allow detection of the first device as part of a peer discovery operation. While the identifier being communicated by be a device identifier, in some embodiments, the communicated identifier identifies, e.g., a fact preference, product, interest, network, service, user.

Operation proceeds from step 316 to step 318. In step 318 the first device transmits, e.g., broadcasts, the second identifier to the second device. In some embodiments, the first and second devices are wireless peer to peer communications devices. Following step 318, the operation does not terminate and it should be appreciated that various steps discussed above, e.g., step 304 to step 318 may, and sometime do repeat on a periodic basis. For example, the device may transmit the first and second identifiers in the form of a 13 bit signal every second. While described as generating and transmitting first and second identifiers, it should be appreciated that steps 312-318 may be implemented as a repeated iteration of steps 304-310. While the same identifier may be communicated repeatedly using a different secured signal over time, it is often common for the first device to transmit multiple different identifiers corresponding, e.g., to different fact preferences, products, interests, networks, services, users in which case, the identifier supplied to the input of the computation module changes as the first device seeks to broadcast a different identifier. Thus while the first and second identifies may communicate the same identifier but using different secured values, in some embodiments they communicate different identifiers associated with the first peer to peer communications device.

FIG. 4, which comprises the combination of FIGS. 4A and 4B, is a flowchart of an exemplary method of operating a second device to communicate with a first device in accordance with one exemplary embodiment. The first device is, e.g., the first peer to peer communications device 102 and the second device is, e.g., the second peer to peer communications device 104.

Operation starts in step 402 where the second device is powered on and initialized. Operation proceeds from step 402 to step 403 wherein identifier information and/or other discovery information is received from the first communications device, e.g., using out of band signaling. This information may, and in various embodiments is, stored in the second device 104 so that it is available for later interpreting of secured broadcast signals received by the second device.

Operation proceeds from step 403 to steps 404 and step 406, which are performed in parallel in some embodiments. However, steps 404 and 406 do not necessarily have to be performed in parallel and in some embodiments they are performed sequentially, e.g., with the order depending on when the signals are received. In step 404, the second device is operated to receive a first identifier signal communicating the first identifier from the first device. In some embodiments receiving the first identifier signal includes receiving a broadcast signal over an airlink, said broadcast signal communicating said first identifier.

In step 406 a first identifier signal communicating a first identifier is received from the first device, e.g., in a broadcast signal communicated over an airlink. The communicated identifier is recovered in step 406 and then used in step 412 as will be discussed below.

In step 404 the second device receives a signal from the third device, e.g., a beacon or a GPS transmitter. Operation proceeds from step 404 to step 408. In step 408, the second device derives a value from the signal received from the third device in step 406. The value is derived in the same manner that the first device derives a first value from the signal from the third device. Operation proceeds from step 408 to step 410.

In step 410, the second device computes a first discovery value using the derived first value and the stored identification information, e.g., an identifier, associated with the first device. Operation proceeds from step 410 to step 412. In step 412 a match determination is made based on the first discovery value computed by the second device and the first identifier which was received by the second device. The match determination determines if a stored identifier of interest corresponds to the first device or not. In some embodiments, said determining includes making a probabilistic determination. For example, the second device may employ a probabilistic determination mechanism where it matches, e.g. first X bits of the received first identifier out of total of its Y bits, with the first M bits of the computed fist discovery value out of total of N bits in the first discovery value, to make a probabilistic determination as to whether there is a match between the first identifier and the computed first discovery value. Based on the result of such a probabilistic match determination, it may be concluded whether or not the stored identification information corresponds to the first device, with a match determination indicating correspondence. Operation proceeds from step 412 to step 414

Step 414 is a decision making step. In step 414, if it is determined that the stored identification information does not correspond to the first device, as indicated by a lack of a match in step 412, then the operation proceeds to steps 404 and 406 with the processes of attempting to find a match continuing on an ongoing basis over time. In some embodiments the match determination made in step 412 is considered sufficient to make a decision of whether or not to proceed with establishing a connection with the first device.

However, in embodiments where a higher degree of certainty is desired, multiple matches with a signal from the first device are required before a conclusive decision with regard to detection of the first device is made. This multiple step embodiment is particularly useful where very few bits are transmitted in each broadcast discovery signal and multiple devices may end up briefly transmitting the same number of bits, e.g., due to truncation of the output of the securing operation prior to transmission. In such embodiments after an initial match is determined in steps 412, 414 operation proceeds to step 416 via connecting node 415.

In step 416, the second device receives an additional signal from the third device, e.g. third device 112 of FIG. 2. The additional signal is received at a different point in time, i.e., a point in time subsequent to the time when a first signal was received from the third device in step 406. The additional signal includes air interface timing and/or other information. Operation proceeds from step 416 to step 418. In step 418, the second device receives a second identifier signal from the first device. Although steps 416 and 418 have been shown to occur sequentially, it should be appreciated that the steps 416 and 418 need not occur sequential and may occur in parallel or in any order depending on the timing of the signals being received.

In step 420 the second device 104 derives a value from the received additional signal from the third device. Next, in step 422, the second device computes a second discovery value from the derived second value and the stored identification information, e.g., the identifier used to generate the first discovery value. In some embodiments the derived first and second values and thus first and second discovery values, are time dependent values. As discussed in the example of FIG. 2, the computation module 220 may be used to compute the first and second discovery values. In computation of the first and second discovery values, the computation module 220 uses the input it receives, i.e., the derived value from the signal received from the third device, and the stored information. In some embodiments, computation of the first and second discovery values is performed according to a function known to the devices corresponding to said stored identification information. For example, the computation of the first and second discovery values may be performed in accordance with certain security feature which is known to the first and/or the second device. In some embodiments, as discussed above the identification information identifies, e.g., a fact preference, association, entity, software application, product, interest, network, service, user. Operation proceeds from step 422 to step 424. In step 424, the second device performs a match determination to determine if the computed second discovery value matches the second identifier received from the first device. The operation proceeds from step 424 to step 426.

In step 426, after having performed a match determination using the first and second discovery values as described with regard to steps 412 and 424, the second device 104 makes a determination as a function of both the first and second computed discovery values and communicated first and second identifiers from the first device, as to whether or not stored identification information in the second device corresponds to the first device. The operation proceeds from step 426 to step 428. Step 428 is a decision making step. In step 428, the flow of processing is controlled based on the output of determination step 426. If in step 426 it was determined that the stored identification information does not correspond to the first device then the operation proceeds from step 428 to steps 406, 406 wherein the device continues to receive and processes discovery signals in an attempt to determine the presence of peer devices of interest. However, if it was determined in step 426 that the stored identification information corresponds to the first device then operation proceeds from step 428 to step 430.

In step 430 an alert signal is generated by a module employed by the second device which alerts the upper level entity/module in the second device that a peer of interest is available, e.g., the first communications device 102. For example if the second device happened to be monitoring for, e.g., a identifiers of device, network, product, or service of interest, such as those stored in memory of the second device 102, and concludes that the advertising party, e.g. the first device, is communicating such an identifier an alert is generated and provided to the application module 214 so that the application module can initiate a communications session with the peer of interest. The alert may include information indicating the identifier that was detected and/or the device to which the detected identifier was determined to correspond. This information may be used in establishing a communications session with the first device 102.

While various exemplary devices have been described, exemplary first and second devices which can be used as the first and second devices 102, 104 will be described in still further detail with regard to FIGS. 5 and 6, respectively.

Figure 5:
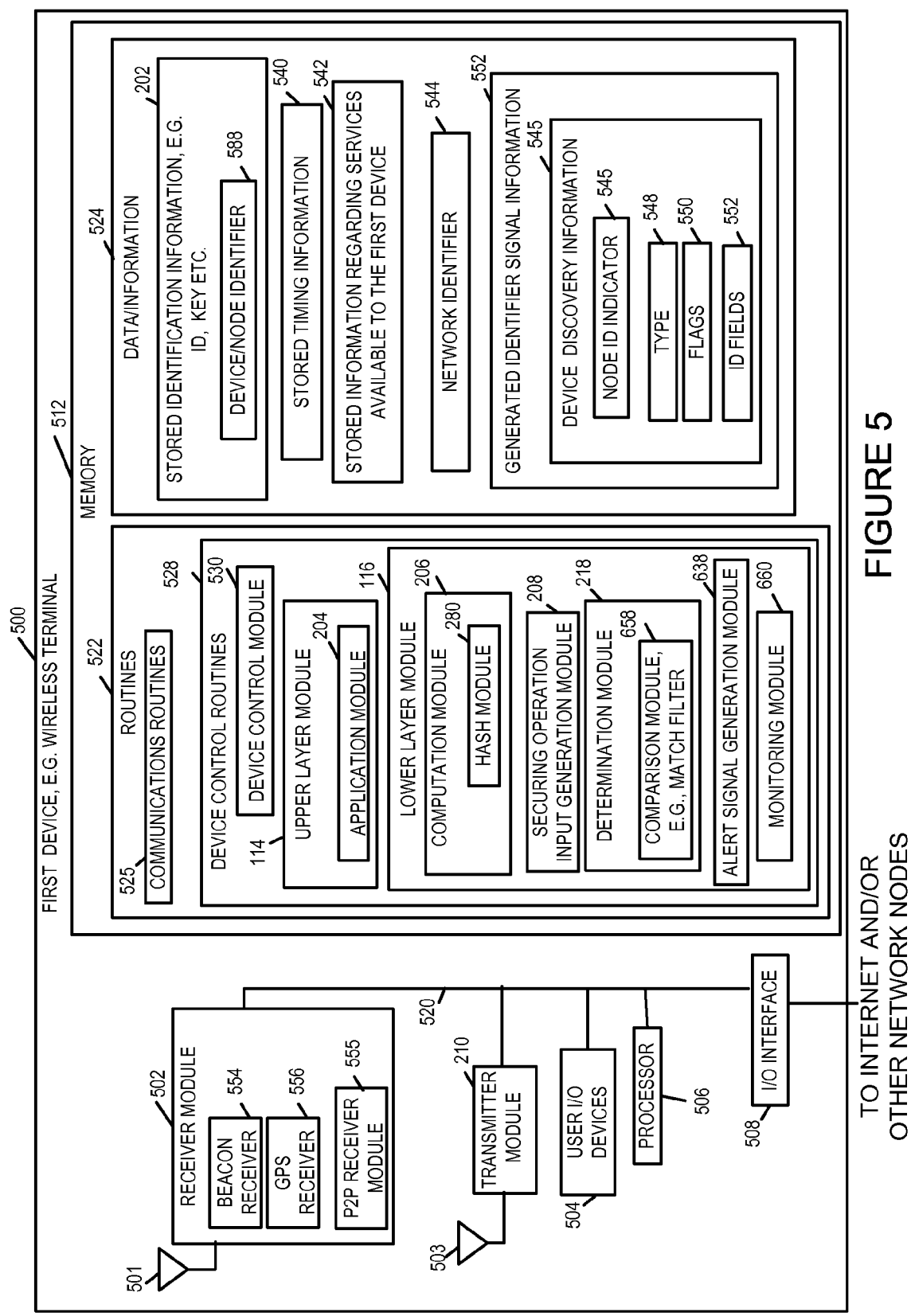
FIG. 5 illustrates an exemplary communications device which may be used as the first or second communications device of FIG. 1, e.g., a mobile node supporting peer to peer communications, in accordance with an exemplary embodiment.

FIG. 5 is a drawing of an exemplary communications device 500 which may be used as the first device 102 of FIG. 1, e.g., a mobile node supporting peer to peer communications, in accordance with an exemplary embodiment. FIG. 5 includes several modules which are same or similar to the modules discussed earlier with regard to the example of FIG. 2. Accordingly, such modules will be identified in FIG. 5 using the same reference numbers as used in FIG. 2. As previously discussed, the first and second peer to peer communications devices may be implemented in the same manner but with each device performing various functions whether it is sending or receiving peer discovery signals. Accordingly, is should be appreciated that the wireless terminal 500 may serve as either the first device 102 or the second device 104 shown in FIGS. 1 and 2. For the sake of brevity and to avoid repetition, the operation/functions of several elements and/or modules used in the first and second devices 102, 104 that have already been explained and discussed in detail will not be discussed here again in detail.

As shown in FIG. 5, exemplary first device 500 includes a receiver module 502, a transmitter module 210, user I/O devices 504, a processor 506, I/O interface 508 and memory 512 coupled together via a bus 520 over which the various elements may interchange data and information. The transmitter module 210 generates identifier signals from identifier values supplied thereto and transmits, e.g., broadcasts, the generated identifier signals.

Memory 512 includes routines 522 and data/information 524. The processor 508, e.g., a CPU, executes the routines 522 and uses the data/information 524 in memory 512 to control the operation of the communications device 500 to implement methods, e.g., the method of flowchart 300 of FIG. 3 and/or the method shown in FIG. 4.

Receiver module 502, e.g. a wireless receiver, includes a beacon receiver module 554, a peer to peer receiver module 505 and a GPS receiver module 556. Receiver module 502 is coupled to a receive antenna 501 via which the communications device 500 receives signals from other devices, e.g., beacon transmitters, GPS transmitters and other peer to peer communications devices. Received signals may include, e.g., signals from the third device, e.g., a beacon or GPS signals. P2P receiver module 555 is used for receiving and recovering, e.g., decoding, information received from other peer devices. Transmitter module 210, e.g., a wireless transmitter, is coupled to transmit antenna 503 via which the communications device 102 transmits signals to other communications devices. In some embodiments, the same antenna is used for the receiver and the transmitter. Transmitted signals include, e.g., first and second identifier signals. In some embodiments, transmitted signals include a broadcast signal communicating the first identifier and another broadcast signal including the second identifier. Peer to peer communications signals and session establishment signals may also be transmitted by module 210.

Routines 522 include a communications routine 526 and device control routines 528. The communications routine 526 implements the various communications protocols used by the communications device 102. The device control routines 528 include an upper layer module 114, a lower layer module 116 and a device control module 530 for controlling the operation of various elements of the first device 102. For example, the device control module 530 controls, among other things, the transmitter module 506 to transmit a second identifier at a fixed time offset from a time at which the first identifier is transmitted in accordance with an exemplary embodiment. The upper layer module 114 further includes an application module 204. The lower layer module 116 further includes a computation module 206 and a securing operation input generation module 208. The computation module 206 includes a hash or other module 280 for performing a securing operation to generate an identifier value from the inputs supplied to the computation module 206. The operation/functions performed by the upper layer module 114, application module 204, lower layer module 116 and the computation module 206 will not be discussed in detail again since it has been discussed earlier in the example of FIG. 2.

The lower layer module also includes a determination module 218, in addition to the securing operation input generation module 208, an alert signal generation module 638 and a monitoring module 660 which are used together to detect the presence of other peer devices broadcasting on or more identifiers of interest. The monitoring module 660 is configured to monitor the received signals/messages for the presence of, e.g., identifier signals communicated from another peer device, identification/discovery information signals advertised from other peer devices.

The determination module 218 is responsible for making a match determination by, e.g., comparing the computed discovery values (e.g., first and second discovery values) with a received identifier value and then making a determination if one or more identifiers of interest included in the stored information 212 have been received. For example, in some embodiments the determination module 218 includes a comparison module 658 which is implemented in some but not all embodiments as a match filter. The comparison module 658, e.g., match filter, is configured to compare and determine if the computed discovery value, e.g., the first discovery value matches the first identifier. In some embodiments when the device 500 is operating as the second device, the determination module 218 is configured to determine, as a function of the first and second discovery values and communicated first and second identifiers, whether or not the stored identification information corresponds to the first device. As discussed above, in some embodiments, the determination module makes a probabilistic determination, in accordance with the exemplary method presented in this application. For example, the determination module 218 employs a probabilistic determination mechanism in some embodiments. Based on the result of such a probabilistic determination, it may be concluded whether the stored identification information 212 corresponds to the first device.

The alert signal generation module 638 is configured to generate an alert signal once it is determined that the stored identification information corresponds to the first device. The alert signal indicates that the first device is of interest because one or more identifiers of interest in the stored identification information have been determined to match a received signal, indicating that identifiers corresponding to, e.g., the first device have been received by the wireless terminal 500 while operating as the second device 104. For example, the alert signal generation module 638 generates an alert which is presented, e.g., in the form of a ringtone, beep, a vibration, a flashing display on a device screen, etc., indicating that the first device of interest has been detected. The device screen may be part of the user I/O devices 504.

Data/information 524 includes a plurality of stored sets of information including stored identification information 202, stored timing information 540, stored service information 542 regarding services available to the first device, network identifier 544 and the information to be communicated in an identifier signal 552 broadcast by the transmitter 210. The stored information 202 includes, e.g., various identifiers corresponding to one or more devices, device identification information, keys, etc. corresponding to the first device, as well as identification information associated with other items of interest such as devices, services, networks etc. For example, the stored information 202 may include information/fields that may, and sometimes are used in the computation of the identifier signals to be communicated to other peer devices, e.g. the first and second identifier signals which are communicated to the second peer device in accordance with the exemplary methods presented in this application. The stored information 202 may also include a locally unique device/node identifier 588. The locally unique node identifier 588 is, e.g., the physical/MAC address of the first device. In addition, the stored information may also include identification information/discovery credentials corresponding to other peer devices which may be of interest to the first device. For example, in some embodiments, the stored information 202 also includes identification and/or discovery information communicated out of band from other peer devices to the first device 102. It should be appreciated that the information 202 is not only restricted to identification/discovery information corresponding to devices, but, as discussed above it may include information corresponding to services, networks, users, product, applications etc. which may be of interest to the first device.

The stored timing information 540 includes, in some embodiments, timing information derived from a signal received from the third device, e.g., signal 134. The stored timing information 540 may be generated by the securing operation input generation module 208 and is temporarily stored in the first device with the value being periodically refreshed. The stored timing information 540 may, and in some embodiments is, used as an input to the computation module 206. The stored service information 542 includes information regarding the services available to the first device from a service provider, e.g., long distance calling, GPS navigation services, web browsing etc. The network identifier 544 includes information regarding the network/service provider which provides services to the first device.

Generated identifier signal information 552 includes, in some embodiments, device discovery information 545, which further includes a node ID indicator 546, a type field 548, flags 550 and a ID fields 552. The node ID indicator 546 is e.g., a portion of the locally unique node identifier/fewer bits of the node identifier 588. The type field 548 indicates, e.g., the format of other fields present in the discovery information 545, e.g., format of flags 550, ID fields 552. The flags 550 are used to indicate or more binary conditions, e.g., capabilities or features. In some embodiments, flags are used to identify a device type, e.g., a router. The ID fields 552 include, e.g., identifiers corresponding to one or more identities and/or services associated with the first device. For example, in some embodiments the first device has multiple IDs being associated with itself, e.g., a work ID, a home ID, a club ID etc. which it may wish to include in the identification/discovery information being transmitted. The generated identifier signal information 522 may, and sometime is, transmitted as identifier signal 132.

In some embodiments, a portion of the discovery information to be conveyed is included in each of multiple identifier signals which are transmitted to other peer device(s) during a period of time. Some portions of discovery information, e.g. a subset of flags may be sufficiently time critical to include in each of the identifier signals being transmitted during the portion of time. In some embodiments, to be able to interpret some discovery information being communicated, a receiving device may require use of a received type value. In some such an embodiments, the frequency at which type values are conveyed may impact the ability to react to partial discovery information included in an identifier signal. In some such embodiments, a type field is included in each identifier signal to facilitate rapid recovery of discovery information being conveyed in a received transmitted identifier signal. However, this is not mandatory in all embodiments.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations, communications devices and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Some embodiments are directed to a computer program product comprising a computer-readable medium, e.g., a physical medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems such as CDMA systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In various embodiments the peer to peer communications devices are implemented as notebook computers, personal data assistants (PDAs), or other portable devices including receiver/transmitter circuits and logic and/or routines, for implementing the methods.

What is claimed is:

1. A method of operating a first device to communicate identification information to a second device, comprising:
   receiving a signal from a third device, wherein the signal includes air interface timing information;
   deriving a first value based at least in part on the air interface timing information;
   computing a first identifier by hashing the derived first value with stored identification information stored in said first device, the computed first identifier for securing identification information communicated from the first device to the second device;
   transmitting said first identifier to the second device;
   receiving an additional signal;
   computing a second identifier from a second value derived from the received additional signal and said stored identification information to generate the second identifier, the computed second identifier for securing identification information communicated from the first device to the second device; and
   transmitting said second identifier to the second device,
   wherein said first and second values are time dependent values.

2. The method of claim 1, wherein said first identifier includes fewer bits than said stored identification information.

3. The method of claim 1, wherein transmitting said first identifier includes transmitting a broadcast signal over an airlink, said broadcast signal communicating said first identifier.

4. The method of claim 1, wherein said third device is one of a beacon transmitter and a GPS transmitter.

5. The method of claim 1, wherein said computing of said first and second identifiers is performed according to a function known to said second device, said stored identification information also being known to said second device.

6. The method of claim 1, wherein said first and second devices are wireless peer to peer communications devices.

7. The method of claim 1, wherein said identification information identifies one of a fact, preference, association, product, service, software application, interest, network, entity, and user.

8. A first device, comprising:
   a receiver module configured to receive a signal from a third device, wherein the signal includes air interface timing information;
   a secure operation input generation module configured to derive a first value based at least in part on the air interface timing information;
   a computation module configured to compute a first identifier by hashing the derived first value with stored identification information stored in said first device, the computed first identifier for securing identification information communicated from the first device to a second device; and a transmitter module configured to transmit said first identifier to the second device wherein said receiver module is further configured to receive an additional signal;

wherein said computation module is further configure to compute a second identifier from a second value derived from the received additional signal and said stored identification information to generate the second identifier, the computed second identifier for securing identification information communicated from the first device to the second device; and wherein said transmitter module is further configured to transmit said second identifier to the second device, wherein said first and second values are time dependent values.

9. The first device of claim 8, wherein said first identifier includes fewer bits than said stored identification information; and wherein said transmitter module is a wireless transmitter for transmitting said first identifier.

10. The first device of claim 8, wherein said third device is one of a beacon transmitter and a GPS transmitter.

11. The first device of claim 8, further comprising:
a memory module including said stored identification information; and
wherein said computation module is configured to compute said first and second identifiers according to a function known to said second device, said stored identification information also being known to said second device.

12. The first device of claim 8, further comprising:
a control module used to control said transmitter module to transmit said second identifier at a fixed time offset from a time at which said first identifier is transmitted; and
wherein said first and second devices are wireless peer to peer communications devices.

13. The first device of claim 8, wherein said first identifier includes fewer bits than said stored identification information.

14. The first device of claim 8, wherein said transmitter module is a wireless transmitter for transmitting said first identifier.

15. The first device of claim 8, wherein said receiver module is one of a GPS receiver and a beacon receiver; and
wherein said first device further includes:
a receiving module for receiving peer to peer signals.

16. A computer program product for use in a first device, comprising:
a non-transitory computer readable storage medium comprising:
code for causing a computer to receive a signal from a third device, wherein the signal includes air interface timing information;
code for causing a computer to derive a first value based at least in part on the air interface timing information;
code for causing a computer to compute a first identifier by hashing the derived first value with stored identification information stored in said first device, the computed first identifier for securing identification information communicated from the first device to a second device;
code for causing a computer to transmit said first identifier to the second device;
code for causing a computer to receive an additional signal;
code for causing a computer to compute a second identifier from a second value derived from the received additional signal and said stored identification information to generate the second identifier, the computed second identifier for securing identification information communicated from the first device to the second device; and
code for causing a computer to transmit said second identifier to the second device, wherein said first and second values are time dependent values.

17. A method of operating a second device, comprising:
receiving a signal from a third device, wherein the signal includes air interface timing information;
deriving a value based at least in part on the air interface timing information;
receiving a first identifier signal communicating a first identifier from a first device, the first identifier for securing identification information communicated from the first device to the second device;
computing a first discovery value by hashing the derived value with stored identification information stored in said second device;
determining, based on the computed first discovery value and said first identifier, if the stored identification information corresponds to the first device; and
receiving an additional signal;
receiving a second identifier signal communicating a second identifier from the first device, the second identifier for securing identification information communicated from the first device to the second device;
computing a second discovery value from a value derived from the additional signal and said stored identification information stored in said second device; and
making, as a function of the first and second computed discovery values and the communicated first and second identifiers, a determination as to whether or not the stored identification information corresponds to the first device, wherein said first and second values are time dependent values.

18. The method of claim 17, wherein determining if the stored identification information corresponds to the first device includes determining if the computed first discovery value matches said first identifier.

19. The method of claim 17, wherein said determining including making a probabilistic determination; and
wherein said first identifier includes fewer bits than said stored identification information.

20. The method of claim 17, further comprising:
generating an alert indicating that the first device is of interest because the stored identification information has been determined to correspond to the first device.

21. The method of claim 17,
wherein said third device is one of a beacon transmitter and a GPS transmitter.

22. The method of claim 17, wherein said computing of said first and second discovery values is performed according to a function known to devices corresponding to said stored identification information.

23. The method of claim 17, wherein said first and second devices are wireless peer to peer communications devices.

24. The method of claim 17, wherein said identification information identifies one of a fact, preference, association, product, service, software application, interest, network, entity, and user.

25. A second device, comprising:
a receiver module configured to receive a signal from a third device and a first identifier signal communicating a first identifier from a first device, wherein the signal from the third device includes air interface timing information, and the first identifier secures identification information communicated from the first device to the second device;
a secure operation input generation module configured to derive a value based at least in part on the air interface timing information;
a computation module configured to compute a first discovery value by hashing the derived value with stored identification information stored in said second device;
a determination module configured to determine, based on the computed first discovery value and said first identifier, if the stored identification information corresponds to the first device;
wherein said receiver module is further configured to receive an additional signal and a second identifier signal communicating a second identifier from the first device, the second identifier for securing identification information communicated from the first device to the second device;
wherein said computation module is further configured to compute a second discovery value from a value derived from the additional signal and said stored identification information stored in said second device; and
wherein said determination module is further configured to determine if the computed second discovery value matches said second identifier, wherein said first and second values are time dependent values.

26. The second device of claim 25, wherein said determination module includes a comparison module configured to determine if the computed first discovery value matches said first identifier;
wherein said determination module makes a probabilistic determination; and
wherein said first identifier includes fewer bits than said stored identification information.

27. The second device of claim 25, wherein said receiver module is a wireless receiver module configured to receive a broadcast signal communicated over an airlink, said broadcast signal communicating said first identifier.

28. The second device of claim 25, further comprising:
a memory module including said stored identification information; and
an alert signal generation module configured to generate an alert signal indicating that the first device is of interest because the stored identification information has been determined to correspond to the first device.

29. The second device of claim 25, wherein said determination module includes a comparison module for determining if the computed first discovery value matches said first identifier.

30. The second device of claim 29, wherein said determination module makes a probabilistic determination.

31. The second device of claim 25, wherein said receiver module includes at least one of a GPS receiver and a beacon receiver.

32. The second device of claim 31, further comprising:
a memory for storing said identification information; and
an alert signal generation module for generating an alert signal indicating that the first device is of interest because the stored identification information has been determined to correspond to the first device.

33. A computer program product for use in a second device, comprising:
a non-transitory computer readable storage medium comprising:
code for causing a computer to receive a signal from a third device, wherein the signal includes air interface timing information;
code for causing a computer to derive a value based at least in part on the air interface timing information;
code for causing a computer to receive a first identifier signal communicating a first identifier from a first device, the first identifier securing identification information communicated from the first device to the second device;
code for causing a computer to compute a first discovery value by hashing the derived value with stored identification information stored in said second device;
code for causing a computer to determine, based on the computed first discovery value and said first identifier, if the stored identification information corresponds to the first device;
code for causing a computer to receive an additional signal;
code for causing a computer to receive a second identifier signal communicating a second identifier from the first device, the second identifier for securing identification information communicated from the first device to the second device;
code for causing a computer to compute a second discovery value from a value derived from the additional signal and said stored identification information stored in said second device; and
code for causing a computer to make, as a function of the first and second computed discovery values and the communicated first and second identifiers, a determination as to whether or not the stored identification information corresponds to the first device, wherein said first and second values are time dependent values.

34. A first device for communicating identification information to a second device, comprising:
means for receiving a signal from a third device, wherein the signal includes air interface timing information;
means for deriving a first value based at least in part on the air interface timing information;
means for computing a first identifier by hashing the derived first value with stored identification information stored in said first device, the first identifier securing identification information communicated from the first device to the second device;
means for transmitting said first identifier to the second device;
means for receiving an additional signal;
means for computing a second identifier from a second value derived from the received additional signal and said stored identification information to generate the second identifier, the computed second identifier for securing identification information communicated from the first device to the second device; and
means for transmitting said second identifier to the second device,
wherein said first and second values are time dependent values.

35. A second device, comprising:
means for receiving a signal from a third device, wherein the signal includes air interface timing information;

means for deriving a value based at least in part on the air interface timing information;

means for receiving a first identifier signal communicating a first identifier from a first device, the first identifier securing identification information communicated from the first device to the second device;

means for computing a first discovery value by hashing the derived value with stored identification information stored in said second device;

means for determining, based on the computed first discovery value and said first identifier, if the stored identification information corresponds to the first device;

means for receiving an additional signal;

means for receiving a second identifier signal communicating a second identifier from the first device, the second identifier for securing identification information communicated from the first device to the second device;

means for computing a second discovery value from a value derived from the additional signal and said stored identification information stored in said second device; and means for making, as a function of the first and second computed discovery values and the communicated first and second identifiers, a determination as to whether or not the stored identification information corresponds to the first device, wherein said first and second values are time dependent values.

* * * * *